2,975,164
NEW FLUORINE-CONTAINING POLYMERS AND PREPARATION THEREOF

George H. Crawford, White Bear Lake, Minn., and Elizabeth S. Lo, Princeton, N.J., assignors, by mesne assignments, to Minnesota Mining and Manufacturing Company, St. Paul, Minn., a corporation of Delaware No Drawing. Continuation of abandoned application Ser. No. 523,634, July 21, 1955. This application Mar. 20, 1959, Ser. No. 800,651

9 Claims. (Cl. 260—87.5)

This invention relates to new and useful fluorine-containing polymeric compositions ranging from low molecular weight oils and greases to high molecular weight thermoplastics and elastomers, and to a method of preparation thereof. In one aspect, the present invention relates to new and useful copolymers of a fluorine-containing vinyl ether. In another aspect, this invention relates to a method of preparation of new and useful copolymers of a fluorine-containing vinyl ether.

Fluorine-containing polymers ranging from low molecular weight oils and greases to high molecular weight thermoplastics and elastomers are of outstanding industrial importance due to their marked high thermal and chemical resistance. At the same time, however, these desirable properties are often accompanied by properties which require special molding techniques for the fabrication of molded articles, special techniques for adhesion of the polymer to surfaces such as metal surfaces, as well as other properties which may limit the application of the fluorine-containing polymer unless it is modified in some manner.

It is an object of the present invention to provide new and useful fluorine-containing polymers ranging from relatively low molecular weight oils and greases to high molecular weight plastics and elastomers, and a method for the preparation thereof.

Another object is to provide new and improved fluorine-containing solid polymers which may be fabricated into a variety of useful articles of manufacture.

Another object is to provide new and improved fluorine-containing solid polymers having improved metal adhesion properties.

Another object is to provide a process for the preparation of new and useful fluorine-containing polymers which process leads to a high conversion of monomers to polymer product.

Various other objects and advantages of the present invention will become apparent to those skilled in the art from the accompanying description and disclosure.

The above objects are accomplished by polymerization of 1,1,2,2-tetrafluoroethyl vinyl ether with a polymerizable ethylenically unsaturated organic compound in the presence of a polymerization promoter. The polymerization may be effected in the presence of a free-radical forming promoter or an ionic promoter, and may be carried out in aqueous or non-aqueous media. When the polymerization reaction is carried out in an aqueous polymerization catalyst system, the pH of the system should be no lower than 6, and preferably is 7 or above. The process of the present invention is carried out at a temperature between about —30° C. and about 150° C. under autogenous conditions of pressure, or at superimposed pressures up to about 1200 pounds per square inch gage.

The physical nature of the polymers of 1,1,2,2-tetrafluoroethyl vinyl ether produced by the process of the present invention ranges from oils, greases and waxes to resinous thermoplastic and elastomeric materials. The molecular weight of the polymers ranges between about 5,000 and about 100,000, or higher, depending upon the particular comonomer and the polymerization conditions employed. The polymers of the present invention have particularly good adhesion properties. The lower molecular weight polymers in the oil, grease and wax range are particularly useful, for example, as bonding agents, lubricants, plasticizers, and as ingredients in polish compositions. The higher molecular weight polymers are of value as protective coatings on metal and fabric surfaces, in producing adhesives, films and other molded articles, and as substitutes for natural rubber.

The monomer, 1,1,2,2-tetrafluoroethyl vinyl ether, which is copolymerized in accordance with the present invention is prepared by the addition of ethanol to tetrafluoroethylene at a temperature of about 50° C. yielding 1,1,2,2-tetrafluoroethyl ethyl ether. This fluoro-ether is then chlorinated at a temperature of about 25° C. and dehydrochlorinated in the presence of triethanolamine and powdered sodium hydroxide in xylene to yield the desired 1,1,2,2-tetrafluoroethyl vinyl ether which has a boiling point of 39° C. and a density of 1.395 at about minus 78° C.

The polymerizable ethylenically unsaturated comonomer which may be polymerized with 1,1,2,2-tetrafluoroethyl vinyl ether by the process of the present invention includes the mono- and di-unsaturated acyclic and alicyclic hydrocarbons, preferably having not more than 12 carbon atoms per molecule, which unsaturated hydrocarbons may be substituted and unsubstituted. The substituted mono- and di-unsaturated hydrocarbon comonomers which may be employed are those in which one or more hydrogen atoms is substituted with a corresponding number of substituents such as fluorine, chlorine and bromine atoms, and aryl, carboxyl, carboxylate, amido, nitrile and alkoxy groups. The preferred comonomers are the acyclic mono- and di-olefins having not more than 5 carbon atoms per molecule and preferably having at least 2 halogen substituents on the same carbon atom. Of the di-olefins which may be employed as a comonomer the fluorine-containing conjugated dienes are preferred.

Typical examples of suitable mono- and di-ethylenically unsaturated hydrocarbons which may be employed are ethylene, propene, butene, cyclobutene, cyclohexene, butadiene, 2-methyl-butadiene and 1,4-pentadiene, and compounds containing acetylenic unsaturation in addition to the ethylenic double bond such as monovinyl acetylene and divinyl acetylene.

The halogen-containing monoolefins which may be employed are the partially halogenated ethylenes such as vinyl fluoride, vinyl chloride, vinyl bromide, vinylidene fluoride, vinylidene chloride, vinylidene bromide, 1,1-chlorofluoroethylene and trifluoroethylene; partially halogenated propenes such as 3,3,3-trifluoropropene and 2-chloro-3,3,3-trifluoropropene; partially halogenated butenes such as 3,3,3-trifluoroisobutene, 1,1,1-trifluoro-3-trifluoromethyl butene-2, and hexafluoroisobutene; perhalogenated monoolefins such as trifluorochloroethylene, trifluorobromoethylene, tetrafluoroethylene, dichlorodifluoroethylene, perfluoropropene, 2 - chloropentafluoropropene, 4,4-dichlorohexafluorobutene-1, perfluorocyclobutene and dichlorodifluorocyclobutene.

Typical examples of the halogen-containing diolefins which may be employed are 2-chlorobutadiene, 2-fluorobutadiene, 2-trifluoromethyl-butadiene, 1,1-difluorobutadiene, 1,1-difluoro-2-methyl-butadiene, 1,1,2-trifluorobutadiene, 1,1,3-trifluorobutadiene, 1,1,3-trifluoro - 2 - methyl-butadiene and hexafluorobutadiene.

The aryl substituted ethylenically unsaturated comonomers which may be employed are styrene, phenyl trifluoroethylene, alpha-trifluoromethyl styrene, phenyl trifluoromethyl propene, and bis-(trifluoromethyl) styrenes such as 3,5-trifluoromethyl styrene.

The carboxyl, carboxylate, amido, nitrile and alkoxy substituted olefins which may be copolymerized with 1,1,2,2-tetrafluoroethyl vinyl ether by the process of the present invention include vinyl esters of carboxylic acids such as vinyl acetate, vinyl propionate and vinyl benzoate; alpha-methylene carboxylic acids and their ester, amido and nitrile derivatives such as acrylic acid, methyl acrylate, methyl methacrylate, methyl-alpha-chloroacrylate, methyl-alpha-fluoroacrylate, methyl-alpha-trifluoroacrylate, acrylonitrile, methacrylonitrile, alpha-trifluoromethyl acrylonitrile, and acrylamide. The alkoxy substituted comonomers include vinyl ethers such as vinyl ethyl ether, vinyl isobutyl ether, vinyl-2-chloroethyl ether, and 1,1,2-trifluoro-2-chlorethyl vinyl ether.

It is to be understood that any combination of the above-mentioned comonomers may be reacted with 1,1,2,2-tetrafluoroethyl vinyl ether by the process of the present invention to form useful terpolymers.

The composition of the polymers produced by the process of the present invention may vary over a relatively wide limit such as between about 99:1 and about 1:99 mol percent of combined 1,1,2,2-tetrafluoroethyl vinyl ether to comonomer. The preferred copolymers are those containing at least 5 mol percent of combined tetrafluoroethyl vinyl ether and the particularly preferred copolymers are those containing at least 10 mol percent of combined tetrafluoroethyl vinyl ether. It has been found that the composition of polymers herein described depends to a large extent upon the relative reactivities of comonomers as compared to the reactivity of the fluorinated ethyl vinyl ether, on the molar charge of the monomers and on the conversion to total monomers to polymer product.

It has been found that the reactivity of the above-mentioned comonomers varies with respect to the rate at which they copolymerize with 1,1,2,2-tetrafluorethyl vinyl ether. In general a feed containing a prescribed molar ratio of monomers does not result in a copolymer product having the same composition as the initial charge of monomers, unless the polymerization reaction is allowed to proceed for a sufficient reaction time to obtain an almost 100 percent conversion of monomers to polymer product. When it is desired to obtain a copolymer containing between about 5 and about 95 mol percent of combined 1,1,2,2-tetrafluoroethyl vinyl ether, for example, an initial monomer charge containing between about 5 and about 95 mol percent of the ether is employed and the polymerization reaction is preferably allowed to proceed to a 100 percent conversion of total monomers to copolymer product.

When copolymerizing the above-mentioned comonomers with 1,1,2,2-tetrafluoroethyl vinyl ether the initial monomer charge must be adjusted in order to obtain a product having a desired composition when the conversion of monomers to polymer product is less than 100 percent. For example, when it is desired to copolymerize the fluoroethyl vinyl ether with one of the more reactive comonomers such as 2-trifluoromethyl butadiene, to produce a copolymer having more than about 50 mol percent of ether, an initial molar charge containing at least 60 mol percent of the ether is required. When it is desired to copolymerize 1,1,2,2-tetrafluoroethyl vinyl ether with one of the less reactive monomers such as tetrafluoroethylene, to produce a copolymer containing less than about 50 mol percent of ether, less than about 40 mol percent of the ether is required in the initial monomer charge.

As indicated above, the fluorine-containing polymers of the present invention are prepared in various comonomer ratios at temperatures between about —30° C. and about 150° C. in the presence of a free radical forming initiator or an ionic initiator. The preferred temperature is dependent upon the type of polymerization catalyst system employed as will be discussed in more detail hereinafter. The free radical forming initiators or promoters comprise the organic and inorganic peroxides, and azo compounds. The ionic initiators comprise inorganic halides of the Friedel-Crafts catalyst type and mineral acids. The initiator is generally employed in an amount between about 0.001 and about 5 parts by weight per 100 parts of total monomers employed and preferably are employed in an amount of between about 0.01 and about 1.0 part by weight. The polymerization catalyst systems may be aqueous or non-aqueous and include the aqueous suspension and aqueous emulsion systems, and the mass and solution systems. The copolymerization reaction may also be initiated or catalyzed by actinic or ultraviolet radiation without departing from the scope of the present invention.

The aqueous catalyst systems comprise water and a peroxy compound as the promoter or initiator. Emulsifiers, activators, accelerators, buffers and bases may also be included as ingredients of the aqueous systems. Since aqueous acid media tend to promote the hydrolysis of 1,1,2,2-tetrafluoroethyl vinyl ether, the pH of the polymerization catalyst system should be no lower than 6, and is preferably 7 or above. Of the aqueous systems which may be employed the neutral and alkaline emulsion systems are preferred inasmuch as such systems lead to the production of polymers of the present invention in high yield with the minimum hydrolysis of the tetrafluoroethyl vinyl ether. The different types of aqueous emulsion systems may be conveniently differentiated on the basis of the promoter employed to initiate the polymerization reaction.

One type of aqueous emulsion system is that in which an organic peroxide, which is preferably a water soluble peroxide, is employed as the initiator and a second type is that in which an inorganic peroxy compound is employed as the initiator. Exemplary of the organic peroxides or oxidants which are particularly preferred as the initiators in an aqueous emulsion system are cumene hydroperoxide, diisopropyl benzene hydroperoxide, triisopropyl benzene hydroperoxide, tertiary-butyl hydroperoxide, teriary-butyl perbenzoate and methyl cyclohexanehydroperoxide.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators are generally employed in an amount between about 0.2 and about 0.8 part by weight per 100 parts of total monomers employed. Equimolar amounts of promotor and activator are preferred.

Accelerators which may be employed in the aqueous polymerization systems comprise water soluble variable valence metal salts of sulfates, nitrates, phosphates and chlorides such as cuprous sulfate, ferrous sulfate and silver nitrate. Such activators are generally employed in an amount between about 0.01 and about 1.0 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous emulsion polymerization systems comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of aliphatic acids which may be employed are potassium stearate and potassium oleate and mixtures thereof. The derivatives of fluoroalkanoic acids which may be used include the metal salts of perfluoro acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which may be used as emulsifiers are those of the perfluorochloro acids obtained upon hydrolysis of trifluorochloroethylene-sulfuryl chloride telomers in fuming sulfuric acid. Such perfluorochloro acids have the successively recurring unit, —$CF_2$—CFCl—, and a chlorine-containing end group and an even number of carbon atoms which is preferably between about 6 and about 14 carbon atoms. Typical examples of such emulsifiers are the potassium, sodium and ammonium salts of 3,5,7,8-tetrachloroundecafluorooctanoic acid and of 3,5,6-trichlorooctafluorohexanoate. The emulsifier is generally employed in a quantity between about 0.2 and about 10 parts by weight per 100 parts of total monomer and preferably between about 0.5 and about 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts water, or enough to maintain the pH of the system at a value which is preferably 7 or above.

The temperature employed in aqueous systems is between about 0° C. and about 100° C. and preferably between about 5° C. and about 60° C. The low temperatures, for example, between about 5° C. and about 35° C. are preferably employed when using a redox catalyst system, and the higher temperatures, for example, between about 35° C. and about 60° C. are preferably employed when no accelerator or activator are present.

As indicated above, the polymerization process of the present invention also may be carried out at a temperature between about —30° C. and about 150° C. in a non-aqueous mass or bulk polymerization system comprising a free radical forming promoter such the organic peroxy compounds and azo compounds, or an ionic promoter. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are alpha, alpha-azo-isobutyronitrile, alpha, alpha-azo-methylnitrile and alpha, alpha - azo - ethylnitrile. Exemplary of suitable ionic initiators which may be employed in the mass type polymerization system are Friedel-Crafts type catalysts such as boron trifluoride, aluminum trichloride, stannic chloride, ferric chloride, titanium tetrachloride and phosphorus pentachloride; and mineral acids such as sulfuric acid and phosphoric acid.

The preferred temperature employed to effect polymerization in a mass or bulk system is dependent upon the type catalyst employed. For example, the halogenated peroxides such as trichloroacetyl peroxide, perfluoropropionyl peroxide, and 2,4-dichlorobenzoyl peroxide and azo compounds are preferably employed at a temperature between about —30° C. and about 65° C. The ionic promoters and the non-halogenated peroxy compounds such as acetyl peroxide, benzoyl peroxide and tertiary-butyl peroxide are preferably employed at a temperature between about 30° C. and about 150° C.

The polymerization process of the present invention may also be effected in the presence of an organic solvent instead of or in addition to water. Examples of solvents of this kind are hydrocarbon solvents such as hexane, octane, isooctane, cyclohexane, methyl cyclohexane, and methyl cyclopentanes; aromatic solvents such as benzene, toluene and xylenes; and the oxygenated solvents such as methanol, ethanol, isopropanol, tertiary-butanol, acetone, dioxane, tetrahydrofuran and tertiary-amyl alcohol.

It has been found that the addition of various polymerization modifiers appreciably reduces the molecular weight of the polymer product thereby increasing their solubility and ease of fabrication without unduly affecting the over-all yield. Suitable polymerization modifiers include mercaptans such as dodecyl mercaptan, sulfuryl halides such as sulfuryl chloride, and halogenated organic compounds such as chloroform, 1,1,2-trichlorotrifluoroethane (Freon 113), carbon tetrachloride, bromotrichloromethane and trichloroacetyl chloride. Such modifiers are preferably added in amounts between about 0.1 and about 2 parts by weight per 100 parts of total monomers charged to the polymerization reaction zone.

As above indicated the polymerization reaction of the present invention may be carried out under autogenous conditions of pressure, or at superimposed pressures employing an inert gas such as nitrogen to obtain a desired elevated pressure. When the polymerization is conducted under autogenous pressures at low temperatures such as —30° C., the pressure within the system is generally at a subatmospheric pressure due to the relatively high boiling point of 1,1,2,2-tetrafluoroethyl vinyl ether. The polymerization reaction can be effected over a relatively wide range of reaction time such as between about 0.1 and about 100 hours, but a reaction time between about 2 and about 75 hours is preferred. The longer reaction times usually lead to an almost 100 percent conversion of monomers to polymer product.

The polymerization reaction can be carried out in a batchwise or continuous manner as desired. In conducting the polymerization in a continuous manner a mixture of the monomers is passed continuously through a zone which is maintained at reaction conditions and which can be provided with stirrers or other means of agitation. Alternatively, the catalyst can be injected into the system which is passing through the reaction zone.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The following examples are offered as a better understanding of the present invention and are not to be construed as unnecessarily limiting thereto.

EXAMPLE 1

*Copolymer of 1,1,2,2-tetrafluoroethyl vinyl ether and trifluorochloroethylene*

The following neutral emulsion polymerization system was employed in carrying out the reaction of this example.

|                                                        | Parts by weight |
|--------------------------------------------------------|---:|
| Water                                                  | 200.0 |
| Total monomers                                         | 100.0 |
| Potassium persulfate                                   | 1.0 |
| Potassium 3,5,7,8 - tetrachloroundecafluoro-octanoate  | 0.75 |

After flushing a glass polymerization tube with nitrogen, the tube was charged with 150 grams of water containing 0.75 gram of dissolved potassium 3,5,7,8-tetrachloroundecafluorooctanoate. The polymerization tube was then placed in a solid carbon dioxide-trichloroethylene bath. When the contents of the tube were frozen solid, the tube was charged with 50 grams of water containing 1 gram of dissolved potassium persulfate. The pH of the resulting polymerization medium was adjusted to 7 using a 5 percent aqueous potassium hydroxide solution. The contents of the tube were refrozen and the tube was charged with 55 grams of freshly distilled 1,1,2,2-tetrafluoroethyl vinyl ether and 45 grams of trifluorochloroethylene to make up a total monomer charge containing 50 mol percent of each monomer. The tube was then sealed and rotated end-over-end in a water bath at a temperature of 30° C. for a period of 24 hours. The polymerization was conducted under autogenous pressure. The contents of the tube were then frozen in a liquid nitrogen bath to coagulate the polymer latex. The coagulated product was collected, thoroughly washed with hot water and dried in vacuo at a temperature of 35° C. The product was a tough inelastic resinous solid and was obtained in a 97 percent conversion based on the total monomers charged. Analysis for chlorine and fluorine content showed the product to contain 50 mol percent of combined 1,1,2,2-tetrafluoroethyl vinyl ether and 50 mol percent of combined trifluoroethylene. This copolymer was found to become rubbery at 100° C. and was compression molded at 150° C. at a pressure of 10,000 pounds per square inch to form a continuous, clear, flexible and tough film.

The above procedure was repeated except that a temperature of 50° C. was maintained over a period of 24 hours yielding a tough inelastic resinous product in 99.1 percent conversion. Analysis of this product showed it to contain 50 mol percent of combined 1,1,2,2-tetrafluoroethyl vinyl ether and 50 mol percent of combined trifluorochloroethylene.

These copolymers of 1,1,2,2-tetrafluoroethyl vinyl ether and trifluorochloroethylene can be molded into a variety of useful articles such as O-rings and gaskets, and are also valuable as protective linings for polymerization reactors, tanks and the like.

EXAMPLE 2

*Copolymer of 1,1,2,2-tetrafluoroethyl vinyl ether and vinylidene fluoride*

A polymerization tube was charged with the same neutral emulsion catalyst system used in Example 1 above. Thereafter the tube was charged with 69.2 grams of 1,1,2,2-tetrafluoroethyl vinyl ether and 30.8 grams of vinylidene fluoride to make up a total monomer charge containing 50 mol percent of each monomer. The polymerization reaction was conducted for a period of 24 hours at a temperature of 25° C. under autogenous pressure. The polymer latex thereby obtained was coagulated by freezing and the coagulated product was treated in the same manner as described in Example 1 above. The product was a tough and slightly rubbery product obtained in 99 percent conversion based on the total monomers charged. Analysis for fluorine content showed the product to contain 50 mol percent of combined 1,1,2,2-tetrafluoroethyl vinyl ether and 50 mol percent of combined vinylidene fluoride. Thus product milled easily at 25° C. and was found to have a torsional modulus of 704.2. The percent volume increase of the raw polymer as determined in A.S.T.M. Fuel, Type II, which consists of isooctane (60 percent by volume), benzene (5 percent by volume), toluene), (20 percent by volume) and xylene (15 percent by volume) was only 9.8 percent.

This copolymer is useful as a substitute for tough natural rubbers. The fluorine content and high thermal stability of this copolymer, makes it particularly suited for use in the tropics where natural rubber is subject to degradation from biological attack.

EXAMPLE 3

*Copolymer of 1,1,2,2-tetrafluoroethyl vinyl ether and 1,1,3-trifluoro-1,3-butadiene*

A glass polymerization tube was charged with the same neutral emulsion catalyst system and in the same manner as set forth in Example 1 above. The tube was further charged with 57.0 grams of 1,1,2,2-tetrafluoroethyl vinyl ether and 43 grams of 1,1,3-trifluoro-1,3-butadiene to make up a total monomer charge containing 50 mol percent of each monomer. The polymerization was conducted at a temperature of 50° C. for a period of 24 hours under autogenous conditions of pressure. The polymer product was worked up in the same manner as described in Example 1 above. A rubbery product was obtained in a 23 percent conversion based on the total monomers charged. This polymer is useful as a rubber cement.

EXAMPLE 4

*Copolymer of 1,1,2,2-tetrafluoroethyl vinyl ether and 2-chlorobutadiene*

A glass polymerization tube was charged with the same neutral emulsion catalyst system and in the same manner as described in Example 1 above. Thereafter, the tube was further charged with 62 grams of 1,1,2,2-tetrafluoroethyl vinyl ether and 38 grams of chloroprene to make up a total monomer charge containing 50 mol percent of each monomer. The polymerization reaction was carried out at a temperature of 50° C. for a period of 23 hours under autogenous pressure. Thereafter the polymer product was worked up on the same manner as described in Example 1 above. A slightly rubbery product having good mechanical properties was obtained in a 22 percent conversion based on the total monomers charged. Chlorine and fluorine analysis of this product showed it to contain 12 mol percent of combined 1,1,2,2-tetrafluoroethyl vinyl ether and 88 mol percent of combined 2-chlorobutadiene.

EXAMPLE 5

*Copolymer of 1,1,2,2-tetrafluoroethyl vinyl ether and 2-trifluoromethyl-1,3-butadiene*

The following alkaline emulsion polymerization catalyst system was employed in the reaction of this example.

|                        | Parts by weight |
|------------------------|---:|
| Water                  | 200.0 |
| Total monomers         | 100.0 |
| Potassium persulfate   | 1.0 |
| Sodium metabisulfite   | 0.4 |
| Potassium stearate     | 5.0 |

After flushing a glass polymerization tube with nitrogen, the tube was charged with 20 grams of water containing 0.4 gram of dissolved sodium metabisulfite, 100 grams of water containing 5 grams of dissolved potassium stearate and having a pH between 10.8 and 11, and 80 grams of water containing 1 gram of dissolved potassium persulfate. After the addition of each ingredient, the contents of the tube were frozen solid in a liquid nitrogen bath. The tube was then connected to a gas transfer system, the contents frozen further with liquid nitrogen and the tube was evacuated. Thereafter 54 grams of 1,1,2,2-tetrafluoroethyl vinyl ether and 46 grams of 2-trifluoromethyl-1,3-butadiene were charged to the tube to make up a total monomer charge containing 50 mol percent of each of the monomers. The tube was then sealed and rotated end-over-end in a water bath, maintained at a temperature of 35° C. for a period of 48 hours. The polymerization was conducted under autogenous pressure. The contents of the tube were then frozen in a liquid nitrogen bath to coagulate the polymer latex. The coagulated product was collected, thoroughly washed with hot water and dried in vacuo at a temperature of 35° C. The product was a tough and very snappy rubber obtained in a 46.6 percent conversion based on the total monomers charged. Analysis for fluorine content showed the product to contain 10 mol percent of 1,1,2,2-tetrafluoroethyl vinyl ether and 90 mol percent of 2-trifluoromethyl-1,3-butadiene. This product was compression molded at a temperature of 250° F. for 5 minutes yielding a transparent and snappy rubbery sheet. The low temperature properties of this particular copolymer were found to be excellent as exhibited by the fact that the Gehman stiffness value at $T_5$ (that is the temperature at which the product is five times as stiff as it is at 25° C.) was −21° C. This copolymer product is particularly valuable as a rubber cement which does not embrittle at very low temperatures.

EXAMPLE 6

*Copolymer of 1,1,2,2-tetrafluoroethyl vinyl ether and hexafluoropropene*

A glass polymerization tube was charged with the same alkaline emulsion catalyst system and in the same manner as set forth in Example 5 above. Thereafter, the tube was further charged with 48 grams of 1,1,2,2-tetrafluoroethyl vinyl ether and 52 grams of hexafluoropropene to make up a total monomer charge containing 50 mol percent of each monomer. The polymerization reaction was carried out at a temperature of 50° C. for a period of 23 hours under autogenous pressure. The product was worked up in the same manner as described in Example 5 above. A white resinous thermoplastic was obtained in 31.8 percent conversion based on the total monomers charged. Fluorine analysis of the product showed it to contain 94.0 mol percent of combined 1,1,2,2-tetrafluoroethyl vinyl ether and 6 mol percent of combined hexafluoropropene.

This copolymer product is useful as an adhesive, and as a protective lining for reactor vessels in which strong and corrosive chemicals are to be used. It is also useful as a laminate which because of its environment requires good chemical and thermal stability up to 350° F.

EXAMPLE 7

*Copolymer of 1,1,2,2-tetrafluoroethyl vinyl ether and 2-chloropentafluoropropene*

A glass polymerization tube was charged with the same alkaline emulsion catalyst system and in the same manner as set forth in Example 5 above. Thereafter, the tube was further charged with 46.4 grams of 1,1,2,2-tetrafluoroethyl vinyl ether and 53.6 grams of 2-chloropentafluoropropene, to make up a total monomer charge containing 50 mol percent of each monomer. The polymerization reaction was carried out at a temperature of 50° C. for a period of 23 hours under autogenous pressure. The product was worked up in the same manner as described in Example 5 above. A white resinous thermoplastic was obtained in 30.4 percent conversion based on the total monomers charged. Fluorine analysis of the product showed it to contain 87.0 mol percent of combined 1,1,2,2-tetrafluoroethyl vinyl ether and 13 mol percent of 2-chloropentafluoropropene.

This copolymer product is useful as an adhesive, and as a protective lining for reactor vessels in which strong and corrosive chemicals are to be used. It is also useful as a laminate which because of its environment requires good chemical and thermal stability up to 350° F.

EXAMPLE 8

*Copolymer of 1,1,2,2-tetrafluoroethyl vinyl ether and tetrafluoroethylene*

A glass polymerization tube was charged with the same alkaline emulsion catalyst system and in the same manner as set forth in Example 5 above. Thereafter, the tube was charged with 31 grams of 1,1,2,2-tetrafluoroethyl vinyl ether and 44.4 grams of tetrafluoroethylene. The polymerization reaction was effected at a temperature of 20° C. for a period of 72 hours under autogenous pressure. The polymer product was worked up in the same manner as described in Example 5 above. A rubbery product was obtained in an 18 percent conversion based on the total monomers charged. Fluorine analysis of the product showed it to contain 82.5 mol percent of 1,1,2,2-tetrafluoroethyl vinyl ether and 17.5 mol percent of combined tetrafluoroethylene.

EXAMPLE 9

*Copolymer of 1,1,2,2-tetrafluoroethyl vinyl ether and 4,4-dichlorohexafluorobutene-1*

A glass polymerization tube was charged with the same alkaline emulsion catalyst system and in the same manner as set fourth in Example 5 above. Thereafter, the tube was charged with 59 grams of 1,1,2,2-tetrafluoroethyl vinyl ether and 41 grams of 4,4-dichlorohexafluorobutene-1 to make up a total monomer charge containing 70 mol percent of ether and 30 mol percent of the butene. The polymerization reaction was carried out at a temperature of 50° C. for a period of 24 hours under autogenous pressure. The polymer product was worked up in the same manner as described in Example 5 above. A rubbery product was obtained in a 50 percent conversion based on the total monomers charged. Fluorine and chlorine analysis of the product showed it to contain 84.5 mol percent of 1,1,2,2-tetrafluoroethyl vinyl ether and 15.5 mol percent of 4,4-dichlorohexafluorobutene-1. This rubbery product milled easily at 25° C.

This copolymer is useful as a substitute for tough natural rubbers. The fluorine content and high thermal stability of this copolymer makes it particularly suited for use in the tropics where natural rubber is subject to degradation from biological attack.

EXAMPLE 10

*Copolymer of 1,1,2,2-tetrafluoroethyl vinyl ether and trifluoroethylene*

A glass polymerization tube was charged with the same alkaline emulsion catalyst system and in the same manner as set forth in Example 5 above. Thereafter the tube was charged with 61.2 grams of 1,1,2,2-tetrafluoroethyl vinyl ether and 38.8 grams of trifluoroethylene to make up a total monomer charge containing 50 mol percent of each monomer. The polymerization reaction was carried out at a temperature of 25° C. for a period of 23 hours under autogeneous pressure. The polymer product was worked up in the same manner as described in Example 5 above. The product of this copolymerization was a grease useful as a bonding agent and high temperature lubricant.

EXAMPLE 11

*Copolymer of 1,1,2,2-tetrafluoroethyl vinyl ether and 1,1,2-trifluoro-1,3-butadiene*

A glass polymerization tube was charged with the same alkaline emulsion catalyst system and in the same manner as set forth in Example 5 above. Thereafter, the tube was charged with 57.2 grams of 1,1,2,2-tetrafluoroethyl vinyl ether and 42.8 grams of 1,1,2-trifluorobutadiene to make up a total monomer charge containing 50 mol percent of each of the monomers. The polymerization reaction was carried out at a temperature of 50° C. for a period of 23 hours. The polymer product was worked up in the same manner as described in Example 5 above. A rubbery product was obtained in a 47.3 percent conversion. This polymer product was found to mill easily at 25° C. to form a smooth and soft rubbery sheet. When compression molded at 210° C. for 10 minutes the product was a snappy rubber. The low temperature flexibility of this copolymer product was good as represented by the Gehman $T_5$ value which was —9° C.

This copolymer product is useful as a rubber cement, and is a particularly valuable protective coating on metal surfaces which are to be exposed to strong and corrosive chemicals and extreme temperature conditions.

EXAMPLE 12

*Copolymer of 1,1,2,2-tetrafluoroethyl vinyl ether and 1,1-chlorofluoroethylene*

The following neutral emulsion catalyst system was employed in the reaction of this example.

| | Parts by weight |
|---|---|
| Water | 200.0 |
| Total monomers | 100.0 |
| Potassium persulfate | 1.0 |
| Perfluorooctanoic acid | 0.75 |

After flushing a glass polymerization tube with nitrogen the tube was charged with 150 grams of water containing 0.75 gram of dissolved perfluorooctanoic acid and 50 grams of water containing one gram of dissolved potassium persulfate. Sufficient potassium hydroxide in the form of an aqueous solution was added to form the potassium salt of the perfluorooctanoic acid and to adjust the pH of the catalyst solution to a value of 7. The contents of the tube were frozen after the addition of each ingredient, and the tube was evacuated. To the frozen contents in the tube, there were then charged 37.6 grams of 1,1,2,2-tetrafluoroethyl vinyl ether and 62.4 grams of 1,1-chlorofluoroethylene to make up a total monomer mixture containing 25 mol percent of the ether and 75 mol percent of 1,1-chlorofluoroethylene. The tube was then sealed and rotated end-over-end in a water bath maintained at a temperature of 50° C. for a period of 24 hours. The polymerization reaction was carried out under autogenous pressure. The contents of the tube were then frozen in a liquid nitrogen bath to coagulate the polymer latex. The coagulated product was thoroughly washed with hot water and dried in vacuo to constant weight at 35° C. A relatively hard rubber was obtained in 99 percent conversion based on the total monomers charged. Fluorine and chlorine analysis of the product showed it to contain 27 mol percent of combined 1,1,2,2-tetrafluoroethyl vinyl ether and 73 mol percent of combined 1,1-chlorofluoroethylene.

The product of this copolymerization reaction is an excellent waterproofing agent for synthetic fibers and woven fabrics.

EXAMPLE 13

*Copolymer of 1,1,2,2-tetrafluoroethyl vinyl ether and 2-chloro-3,3,3-trifluoropropene*

A glass polymerization tube was charged with the same neutral emulsion catalyst system as set forth in Example 12 above. Thereafter the tube was charged with 52.6 grams of 1,1,2,2-tetrafluoroethyl vinyl ether and 47.4 grams of 2-chloro-3,3,3-trifluoropropene. The polymerization reaction was carried out at a temperature of 50° C. for a period of 72 hours under autogenous pressure. The product was worked up in the same manner as described in Example 12 above. A resinous thermoplastic material was obtained in a 52 percent conversion based on total monomers charged. Chlorine and fluorine analysis showed the product to contain 44 mol percent of combined 1,1,2,2-tetrafluoroethyl vinyl ether and 56 mol percent of combined 2-chloro-3,3,3-trifluoropropene.

This copolymer product is useful as an adhesive, and as a protective lining for reactor vessels in which strong and corrosive chemicals are to be used. It is also useful as a laminate which because of its environment requires good chemical and thermal stability up to 350° F.

EXAMPLE 14

*Copolymer of 1,1,2,2-tetrafluoroethyl vinyl ether and trifluorochloroethylene*

To 1,1,2,2-tetrafluoroethyl vinyl ether (5.5 g.) and chlorotrifluoroethylene (4.5 g.) in a glass polymerization tube is added 0.05 weight percent of trichloroacetyl peroxide. The tube is sealed and maintained at —15° C. for 24 hours after which it is frozen in liquid nitrogen and then broken open. The unreacted monomer is vented off and the remaining polymer is removed, washed with hot water and then dried to constant weight at about 40° C. in vacuo. A 95 percent conversion of monomers to polymer is obtained. The polymer product of this polymerization reaction is a resinous thermoplastic material containing about 50 mol percent of combined 1,1,2,2-tetrafluoroethyl vinyl ether and 50 mol percent of combined trifluorochloroethylene.

The resinous thermoplastic and elastomeric polymers of 1,1,2,2-tetrafluoroethyl vinyl ether produced in accordance with the present invention and especially those obtained by copolymerizing this fluorine-containing ether with halogenated olefins, are particularly valuable as protective coatings which, in the course of performing their function, may come into contact with strong and corrosive chemicals and extreme conditions of temperature. Such protective coatings may be applied to metal surfaces, for example, by conventional dipping or brushing techniques. The elastomeric copolymers which are particularly resistant to hydrocarbon aromatic fuels such as those of 1,1,2,2-tetrafluoroethyl vinyl ether and 2-trifluoromethyl butadiene, are particularly valuable in the manufacture of resilient gaskets, seals and valve diaphragms and as rubber cements. Other molded articles of manufacture may be obtained by molding these polymers at a temperature between about 250° F. and about 500° F. using compression molding and extrusion molding techniques.

As is apparent, the present invention relates to new and useful polymers obtained by polymerizing 1,1,2,2-tetrafluoroethyl vinyl ether with an ethylenically unsaturated organic compound, and to a method of preparation of such polymers in various comonomer ratios. Various alterations and modifications of the polymerization system employed and reaction conditions may become apparent to those skilled in the art without departing from the scope of the invention.

This application is a continuation of my prior application Serial No. 523,634, filed July 21, 1955, now abandoned.

We claim:
1. A novel elastomeric copolymer having a molecular weight in the range of from about 5,000 to about 100,000 of 1,1,2,2,-tetrafluoroethyl vinyl ether and a polymerizable halogen-containing diolefin selected from the group consisting of 1,1,2-trifluorobutadiene, 1,1,3-trifluorobutadiene and 2-trifluoromethyl butadiene.

2. A novel elastomeric copolymer having a molecular weight in the range of from about 5,000 to about 100,000 of 1,1,2,2-tetrafluoroethyl vinyl ether and 1,1,2-trifluorobutadiene.

3. A novel elastomeric copolymer having a molecular weight in the range of from about 5,000 to about 100,000 of 1,1,2,2-tetrafluoroethyl vinyl ether and 1,1,3-trifluorobutadiene.

4. A novel elastomeric copolymer having a molecular weight in the range of from about 5,000 to about 100,000 of 1,1,2,2-tetrafluoroethyl vinyl ether and 2-trifluoromethyl butadiene.

5. The process which comprises copolymerizing a mixture of 1,1,2,2-tetrafluoroethyl vinyl ether and a halogen-containing diolefin at a temperature between about —30° C. and about 150° C. in admixture with a free radical forming polymerization promoter, said mixture containing between about 5 and about 95 mole percent of 1,1,2,2-tetrafluoroethyl vinyl ether based on the weight of the 1,1,2,2-tetrafluoroethyl vinyl ether and the halogen-containing diolefin selected from the group consisting of 1,1,2-trifluorobutadiene, 1,1,3-trifluorobutadiene, and 2-trifluoromethyl butadiene to produce an elastomeric copolymer having a molecular weight in the range of from about 5,000 to about 100,000.

6. The process which comprises copolymerizing a monomeric mixture of 1,1,2,2-tetrafluoroethyl vinyl ether and a polymerizable halogen-containing diolefin selected from the group consisting of 1,1,2-trifluorobutadiene, 1,1,3-trifluorobutadiene and 2-trifluoromethyl butadiene at a temperature between about —30° C. and about 150° C. in admixture with a free radical forming polymerization promoter to produce an elastomeric copolymer having a molecular weight in the range of from about 5,000 to about 100,000.

7. The process which comprises copolymerizing a monomeric mixture of 1,1,2,2-tetrafluoroethyl vinyl ether and 1,1,2-trifluorobutadiene at a temperature between about —30° C. and about 150° C. in admixture with a free radical forming polymerization promoter to produce an elastomeric copolymer having a molecular weight in the range of from about 5,000 to about 100,000.

8. The process which comprises copolymerizing a monomeric mixture of 1,1,2,2-tetrafluoroethyl vinyl ether and 1,1,3-trifluorobutadiene at a temperature between about —30° C. and about 150° C. in admixture with a free radical forming polymerization promoter to produce an elastomeric copolymer having a molecular weight in the range of from about 5,000 to about 100,000.

9. The process which comprises copolymerizing a monomeric mixture of 1,1,2,2-tetrafluoroethyl vinyl ether and 2-trifluoromethyl butadiene at a temperature between about —30° C. and about 150° C. in admixture with a free radical forming polymerization promoter to produce an elastomeric copolymer having a molecular weight in the range of from about 5,000 to about 100,000

References Cited in the file of this patent
UNITED STATES PATENTS

| | | |
|---|---|---|
| 2,631,975 | Lawson | Mar. 17, 1953 |
| 2,732,370 | Codding | Jan. 24, 1956 |
| 2,834,766 | Hoyt | May 13, 1958 |

UNITED STATES PATENT OFFICE
CERTIFICATE OF CORRECTION

Patent No. 2,975,164            March 14, 1961

George H. Crawford et al.

It is hereby certified that error appears in the above numbered patent requiring correction and that the said Letters Patent should read as corrected below.

Column 3, line 34, for "to", first occurrence, read -- of --; column 7, line 34, for "trifluoroethylene" read -- trifluorochloroethylene --.

Signed and sealed this 26th day of December 1961.

(SEAL)
Attest:

ERNEST W. SWIDER
Attesting Officer

DAVID L. LADD
Commissioner of Patents
USCOMM-DC